No. 711,385. Patented Oct. 14, 1902.
G. P. COYLE.
COOKING UTENSIL.
(Application filed Dec. 12, 1901.)
(No Model.)
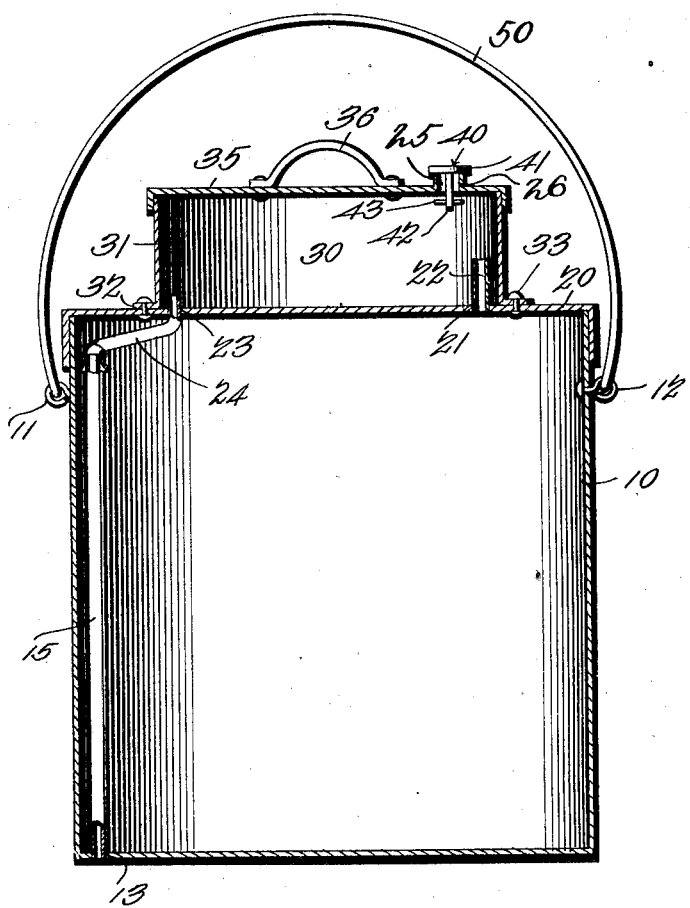

UNITED STATES PATENT OFFICE.

GRACE P. COYLE, OF SOUTH BETHLEHEM, PENNSYLVANIA.

COOKING UTENSIL.

SPECIFICATION forming part of Letters Patent No. 711,385, dated October 14, 1902.

Application filed December 12, 1901. Serial No. 85,683. (No model.)

*To all whom it may concern:*

Be it known that I, GRACE P. COYLE, a citizen of the United States, residing at South Bethlehem, in the county of Northampton and State of Pennsylvania, have invented a new and useful Cooking Utensil, of which the following is a specification.

This invention relates to improvements in culinary vessels such as are usually employed for boiling food by means of which all the odors and steam generated in such process are prevented from escaping into the apartment where the process is being conducted and which conveys such odors into the stove.

The object of the invention is to provide a cooking utensil which is simple in construction and one which may be used both to cook food and to also serve as a warming-oven to keep it warm after it has been cooked.

The drawing represents a longitudinal vertical section of this improved utensil.

The body 10 is provided near its upper end on opposite sides with eyes 11 and 12 for receiving a suitable bail 50 to be used in handling the article. This vessel 10 has a perforation 13 in the bottom thereof near one side adapted to register with the mouth of a tube 15, which extends through said vessel to a point near the top thereof, where it connects with a downwardly-extending tube 24, connected with the top. A top 20 is adapted to fit on said vessel 10 and is provided with an opening 21, having a pipe 22 connected therewith and projecting on the outside of said top. This top also has another opening 23 therein, to which the downwardly-extending tube 24 is connected. This tube 24 depends from the inside of the top, and the lower end thereof fits over the upper end of the tube 15 of the cooking vessel proper.

An auxiliary chamber 30 is formed above the vessel 10 and comprises a circular casing 31, preferably provided at its lower edge with an annular outwardly-extending flange 32, which is riveted or otherwise secured to the top 20. As shown, rivets, as 33, are employed for so securing the casing to the top 20. This casing may, however, be secured in any other desired manner, or it may be made integral with the top. This casing incloses the outer ends of the pipes 22 and 24 and is provided at its upper end with a covering 35, having a suitable handle 36, attached thereto in any desired manner. This cover 35 is provided with a blow-off valve 40 for indicating how fast the water is boiling. This valve, as shown, comprises a disk 41, resting on the outer edges of an annular flange 25, formed on the outer face of the cover 35 and surrounding an opening 26 therein. A stem 42 extends downward from said disk into the chamber 30 and is provided on its lower end with a pin 43, extending transversely therethrough for limiting the outward movement of the disk 41. This chamber 30 is designed to serve as a warming-oven for keeping food warm, while at the same time it is prevented from drying up, as is the case in ordinary warming-ovens.

In the use of this utensil the food to be cooked is placed in the vessel 10 and any suitable liquid poured thereover. The top 20, having the chamber 30 disposed thereon, is then placed over the vessel 10 and the vessel put on the fire, the lid of the stove being removed and the aperture 13 in the bottom of the vessel being thus placed within the draft force of the fire. The steam and odors arising from the cooking operation pass upward through the opening 21 and the pipe 22 into the chamber 30, and after circling about therein they are drawn out through the tubes 15 and 24 by the draft of the fire into the stove and there pass off up the flue. Should the water boil too fast, the steam generated therein will raise the valve-disk 41 and cause it to flap up and down, and thereby warn the cook of the existing condition in the vessel 10. After the food has been cooked to the desired point it is taken from the pot, placed on a suitable dish, and if desired to be kept warm it is placed in the chamber 30 by taking off the cover 35, placing the dish with its contents therein, and then again putting the cover 35 in place. This chamber serves to keep the food warm and moist without exerting any cooking action thereon.

The vessel 10, with its top and the chamber 30 disposed thereon, may be made in any desired shape and of any suitable material.

I claim as my invention—

1. A device of the class described comprising a receptacle having a bail and provided with a tube extending from its bottom to a point adjacent to its top, a removable cover arranged on the receptacle, an exteriorly-arranged casing mounted on the said cover and having a removable top or lid and adapted to serve as a warming-chamber and capable also of collecting vapors and steam, an inlet-pipe extending upward from the cover and arranged within the said chamber, and an escape-tube carried by the cover and extending downward from the chamber and connected with the said tube, whereby the vapors and condensed steam are adapted to pass off through the receptacle into a stove, substantially as described.

2. A device of the class described comprising a receptacle, a cover removably fitted on the receptacle, a casing mounted on the cover and provided with a removable lid and forming a warming-chamber and adapted to collect vapors, an inlet-tube mounted on the cover and extending into the said chamber, and a sectional drain-tube extending from the chamber to the bottom of the receptacle and arranged within the latter, one section of the tube being mounted on and carried by the receptacle and the other being carried by the cover, substantially as described.

In testimony that I claim the foregoing as my own I have hereto affixed my signature in the presence of two witnesses.

GRACE P. COYLE.

Witnesses:
 CHARLES KOHLER,
 J. HARRY KRESGE.